United States Patent [19]

Hershman et al.

[11] 4,046,236

[45] Sept. 6, 1977

[54] LOCKING CONTROL DEVICE

[75] Inventors: Gordon L. Hershman, La Grange; Arthur S. Datta, Willow Springs, both of Ill.

[73] Assignee: International Harvester Company, Chicago, Ill.

[21] Appl. No.: 672,818

[22] Filed: Apr. 1, 1976

[51] Int. Cl.[2] .............................................. F16D 67/00

[52] U.S. Cl. ...................................... 192/8 R; 74/531

[58] Field of Search .......................... 192/8 R; 74/531

[56] References Cited

U.S. PATENT DOCUMENTS

| | | | |
|---|---|---|---|
| 588,598 | 8/1897 | Parsons | 192/8 R |
| 803,046 | 10/1905 | Bjorneby et al. | 192/8 R |
| 1,942,472 | 1/1934 | Craw | 192/8 R |
| 1,963,444 | 6/1934 | Mullins | 192/8 R |
| 2,440,630 | 4/1948 | Blocher | 192/8 R |
| 2,802,374 | 8/1957 | Reid | 192/8 R |
| 2,895,347 | 7/1959 | Reid | 74/531 X |

*Primary Examiner*—Benjamin W. Wyche
*Attorney, Agent, or Firm*—Douglas W. Rudy; Floyd B. Harman

[57] ABSTRACT

A device for allowing the transmission of motion from an input arm to an output means and preventing the transmission of motion from the output means to the input arm. A lockable cam acting on an arcuate surface acts to lock the device while components of the input arm may act to disengage the lockable cam from engagement with the arcuate surface.

2 Claims, 5 Drawing Figures

LOCKING CONTROL DEVICE

BACKGROUND OF THE INVENTION

1. Field of the Invention

This invention relates to operating controls having the input and output mode controlled such that only the input through the normal input member will effect the operation of the control.

More specifically, a locking control device is provided that may be used on a vehicle to set a constant operating condition. Feedback forces from the vehicle to the control are not permitted to affect the adjustment of the control.

2. Description of the Prior Art

Prior art devices preventing feedback forces from effecting a preset operating condition have been in use. Generally the prior art devices depend on a detent relationship between the input handle and the body of the control mechanism. In order to adjust these devices it would be necessary to urge the handle away from the detent by pivoting it in a direction perpendicular to the normal direction of adjustment.

Also devices have been provided that can be adjusted by moving the input lever only in the adjustment plane. A specific example is shown by U.S. Pat. No. 3,727,482. Unfortunately devices of this type are subject to wear and also become misadjusted thus not operating in a reliable manner. The instant invention has no parts which bear under damageable pressure against any other parts when the control device is being adjusted. Consequently this invention is an improvement over the prior art in this area as well as others. The present invention also has the desirable tendency to become more firmly set as a result of feedback forces without getting stuck in a locked position.

SUMMARY OF THE INVENTION

A locking device for use in an application where it is necessary to set a control lever in a given position and be assured that it will remain in that position is provided.

The locking control mechanism includes an arcuate locking plate that is always in contact with a locking cam assembly which communicates between the input arm and the output means, either a shaft or an output arm, and can lock the input arm in one place relative to the arcuate locking plate.

Feedback forces tend to tighten the relationship between the locking control mechanism and the arcuate locking plate. Furthermore, the locking control mechanism is such that the system will not need periodic adjustments due to the double cam arrangement of the locking control mechanism.

Accordingly, it is an object of this invention to provide an irreversible control apparatus that will not allow feedback forces in the linkage to which it is operatively connected to affect the adjustment of the control device.

It is also an object of this invention to provide a control device that will not get out of adjustment during its normal usable life.

BRIEF DESCRIPTION OF THE DRAWINGS

These and other objects and advantages of this locking control device will be appreciated from reading the following description in which.

DETAIL DESCRIPTION OF THE DRAWINGS

Figure 1:
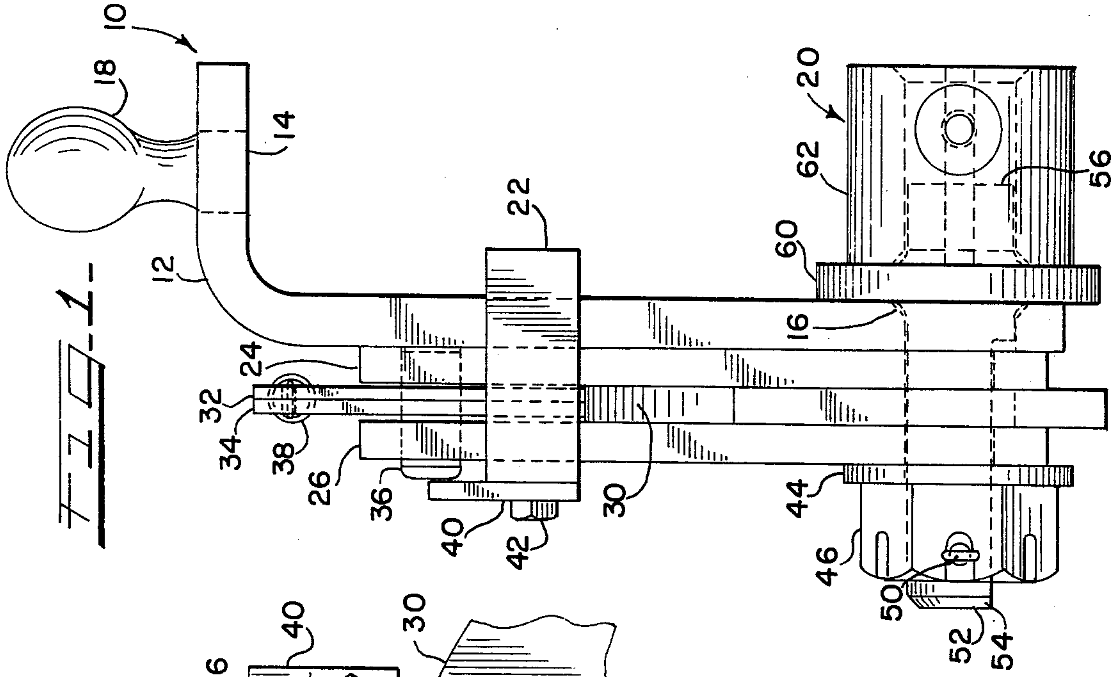
FIG. 1 represents a side elevation view of the locking control device as it would appear in an installation.
Figure 3:
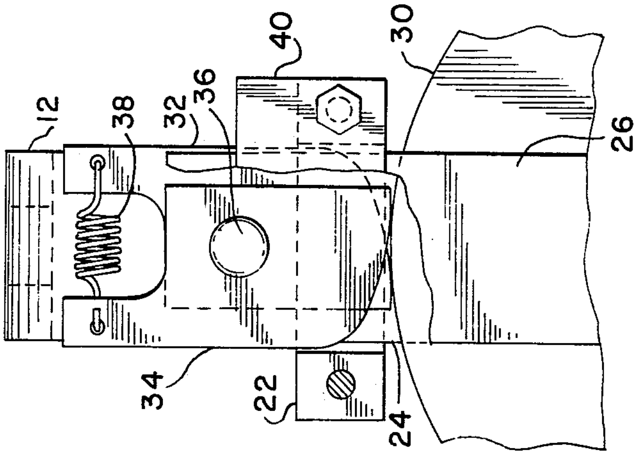
FIG. 3 is a front view of the critical working components.

The accompanying figures represent the invention in detail and like numbers represent like parts throughout. In FIGS. 1 and 3 the components of the invention are set forth in representations of the complete locking control device generally 10. The locking control device has an input arm 12 equipped with an aperture 14 at the upper end thereof for receiving an operating handle 18 as well an aperture 16 at a lower end thereof for accommodating a pivot assembly generally 20. A U-shaped bracket 22 having leg portions projecting perpendicular to the major plane of the input arm is affixed to the input arm.

A pair of output arms, the first being 24 and the second being 26 having upper apertures and lower apertures are also carried on the pivot assembly 20. The first output arm 24 is adjacent to the input arem 12 while the second output arm 26 is spaced outboard from the first arm 24 and is separated from it by the parts of the locking mechanism. These parts include an arcuate locking plate 30 having a plurality of apertures including mounting apertures as well as a central aperture to allow the locking plate 30 to be positioned on the pivot assembly 20. Also included in a cam assembly including an inboard cam 32 and an outboard cam 34 which pivot about a cam pivot pin 36 which passes through an aperture in each cam. A spring 38 is affixed to each cam above the pivot point and is connected to each cam such that it consistently urges the top portion of each cam towards the top portion of the other cam. The specific shape of each cam is discussed further on in this specification.

The cam pivot pin 36 also passes through the upper apertures in the first 24 and the second 26 output arms. The cam pivot pin 36 is retained in position by means of a cam pivot pin retaining strip 40 affixed to the ends of the legs of the U-shaped bracket 22 by means of fasteners such as shown by the screws 42.

The input arm 12, the output arms 24 and 26, and the arcuate locking plate 30 are maintained on the pivot assembly 20 by means of a washer 44 and a castellated nut 46 which is prevented from movement by a cotter pin 50.

The pivot assembly generally 20 comprises an output shaft 52 with the first end 54 and a second end 56. The shaft 52 integrally carries a pivot support 60 which separates the first end 54 from the second end 56. The second end is round in cross section and may accommodate the hub 62 having a complementary internal bore therein. The first end 54 of the shaft is round in cross section immediately adjacent to the pivot support 60 (to accommodate the input arm 12) and is partially round in cross section for the remainder of its length. The portion of the output shaft outboard of the input arm 12 has the lower portion of the cross sectional circle cut off such that the lower part of the output shaft 54 is flat. This semicircular portion is complementary to the lower apertures in the output arms such that any movement of an output arm 24 or 26 results in movement of the shaft 54 due to the keyed relationship therebetween. The outer end of the first end of the shaft 54 is threaded to receive the nut 46 and is also drilled to receive the cotter pin 50.

Figure 2:
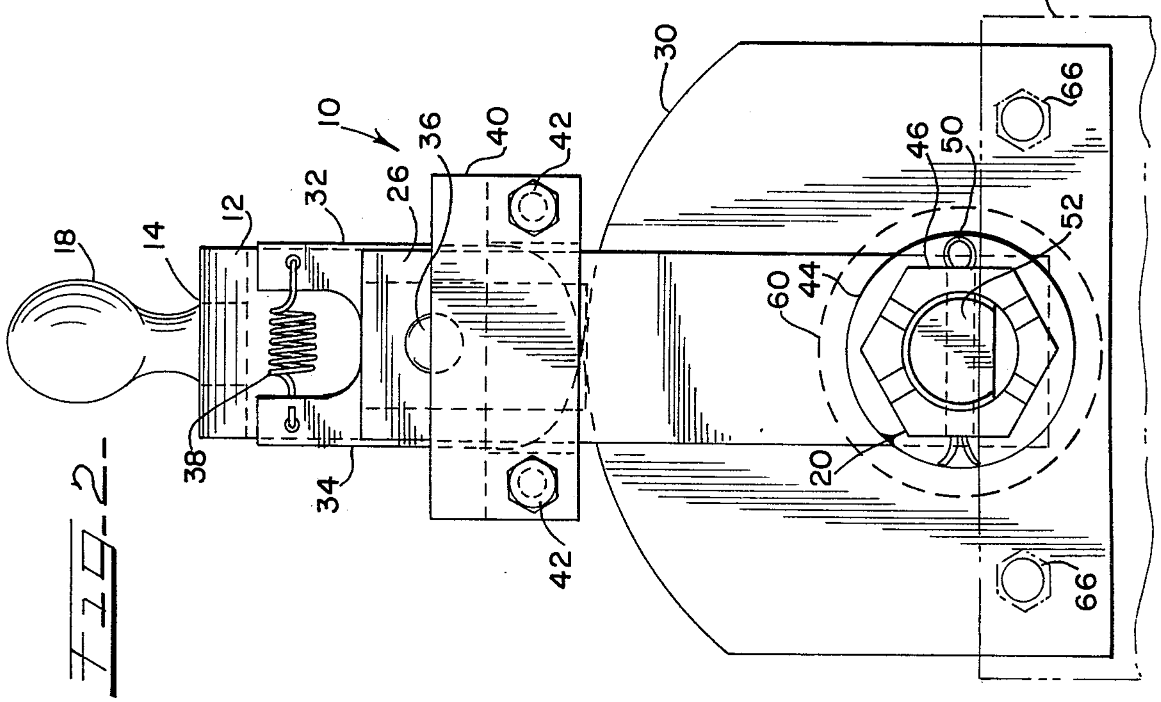
FIG. 2 is a front elevation view of the invention.

In FIG. 2 a portion of the vehicle structure 64 is shown in a broken line presentation to convey the method of mounting the locking control device 10 to a vehicle. Bolts such as 66 may pass through apertures in the arcuate locking plate 30 to affix the unit to the vehicle structure. This representation is only an example and numerous other obvious mounting possibilities exist.

Figure 4:
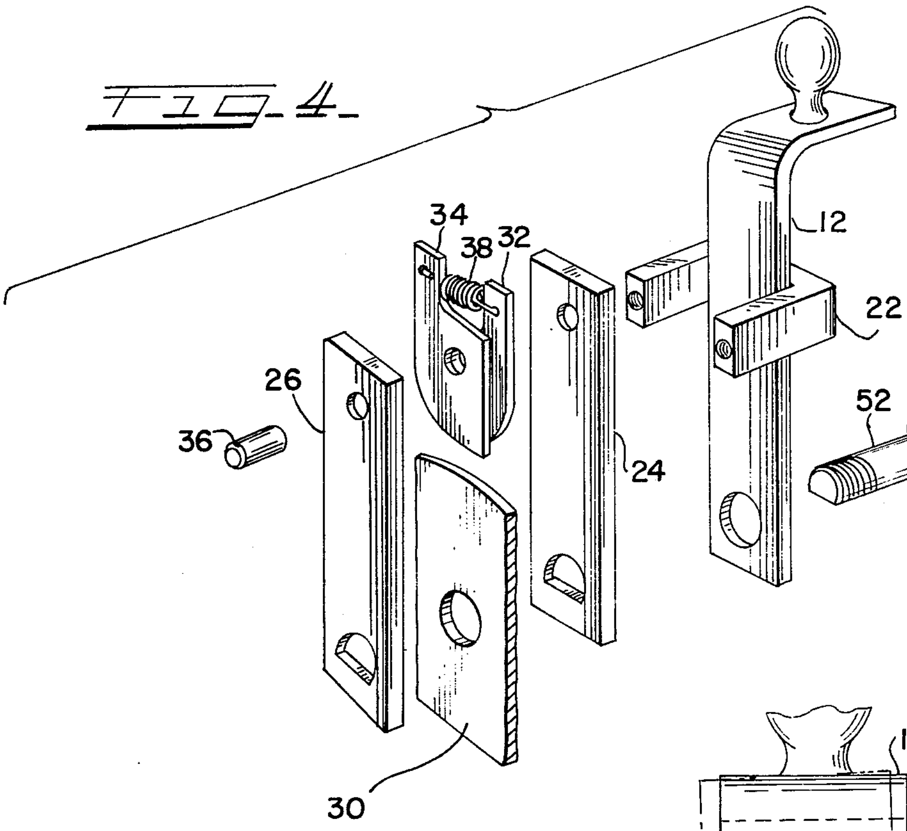
FIG. 4 is a development of the invention showing the relationship between some of the key components.

The relationship between several various elements on the assembly of the locking control device can be seen in FIGS. 3 and 4.

Shown in both views are the input handle 12, the U-shaped bracket 22, the first output arm 24, the second output arm 26, (in FIG. 3 a portion of the second output arm 26 is shown), the arcuate locking plate 30, (only a portion shown) and the cam assembly (32, 34, 36, and 38). FIG. 4 shows the output shaft 52 with its pivot support 60. The cam pivot pin retaining strip 40 and some of the attaching hardware has been left out of FIG. 4 in order to present a clear uncomplicated presentation of the components.

Looking again at FIG. 3 note the shape of the cams 32 and 34. The outboard cam 34 has an arcuate lower portion and straight vertical sides. The projection at the top of the cam may be equipped with an aperture to accommodate the spring 38. Each cam is similar in shape but in use they are arranged as shown. Each cam is engageable with the upper surface (top edge) of the arcuate locking plate 30.

OPERATION

Figure 5:
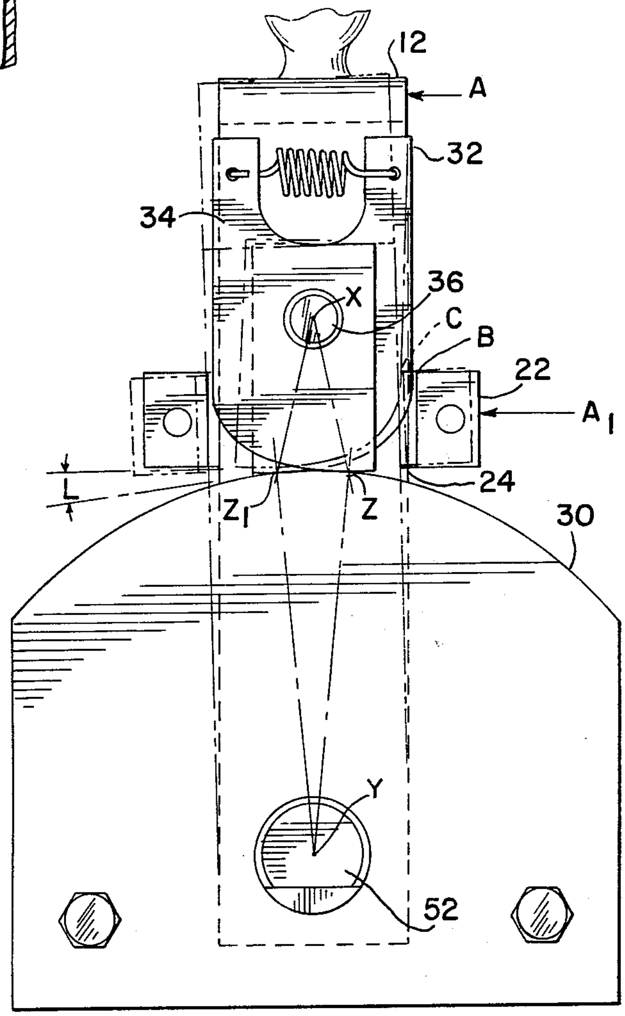
FIG. 5 is a view of a portion of the invention showing the operational condition in a broken line view.

The operation of the device can best be seen in FIG. 5. Again a portion of the locking control device is presented. When adjustment to the equipment under the control of the device is desired, movement of the input handle 12 in the direction "A" will result in bracket 22 moving in the direction of "$A_1$". The top left corner of the right leg bracket (as seen in the drawing) will contact the inboard cam 32 at point "B" and further movement of the input handle in the direction A will urge the cam 32 to the position shown by the dotted line view as it will pivot around the cam pivot pin 36. At this point further input motion will affect the displacement of the output arm (first output arm 24 shown although both will be contacted simultaneously) which will in turn cause the rotation of the output shaft 52 due to the keyed relationship between the output shaft 52 and the arms 24 and 26. The mechanism will be allowed to be moved as the cam 32 will have been pivoted around the cam pivot pin 36 sufficiently far to ensure that its lower surface has been lifted out of contact with the arcuate locking plate as shown by dimension "L". The outboard cam 34 is not affected by movement in the direction A and will simply drag along the surface of the arcuate locking plate 30. Of course the roles of the cams would be reversed when the input arm is moved contra to direction A.

The movement of the output shaft 52 could be translated to motion necessary to cause adjustment of the intended vehicle function. This will be done by conventional means such as bell cranks, levers, pulleys, etc. The hub 62 (FIG. 1) provides an attachment media for a bell crank, a lever, a pulley, or other optional linkage means.

The locking function of the device prevents feedback forces from effecting the operator set adjustment. Both of the cams will ordinarily be in contact with the arcuate locking plate. The camming effect will tend to increase under feedback forces thus rendering the device immovable. This is due to the vector force arrangement resulting from the geometry of the layout. In FIG. 5 "X" and "Y" represent the geometric centers of the cam assembly and the major pivoting assembly respectively. "Z" and "$Z_1$" represent the point of contact between each cam and the arcuate locking plate. As the distance XZ plus ZY is greater than the distance XY rotation of the input arm 12 contra to A is prevented. Also, rotation of the input arm 12 in the direction of A is impossible as the distance XZ plus ZY is greater than the distance XY. Thus, rotation in either direction is not possible due to the feedback forces and the control device will only be adjustable by movement of the input arm 12 to cause the release of one of the cams.

Thus it is apparent that there has been provided a locking control device that fully meets the objects and advantages as set forth in the specification. While the invention has been described in conjunction with the specific embodiments thereof it is evident that many alternatives and modifications and variations such as extentions of the output arms provide a linkage pickup point would be possible. Modifications such as these will be apparent to those skilled in the art in light of the foregoing description. Accordingly, it is intended to embrace all such alternatives, modifications and variations as fall within the spirit and broad scope of the appended claims.

What is claimed is:

1. A locking control device having an input arm and an output means for communicating motion irreversibly from the input arm to the output means further comprising:

an arcuate locking plate with a top edge, the locking plate having a plurality of apertures including mounting apertures and a central aperture;

an input arm having an aperture at a lower end thereof and further being formed at an upper end with a projection perpendicular to the major plane of the input arm, the upper end further equipped with an aperture for accommodating an operating handle;

a U-shaped bracket affixed to the input arm between the lower end thereof and the upper end thereof in position where the arms of the U-shaped bracket project perpendicularly from the input arm in the direction opposite the direction of the upper end of the input arm;

a first and a second output arm having an aperture at each end thereof with the aperture at the upper end thereof circular in shape and the aperture at the lower end thereof semicircular in shape;

a pivot assembly for receiving the first and second output arms, having an output shaft having a flat portion extending from a first end of the output shaft towards a second end of the output shaft compatible in shape with the semicircular aperture of the output arms, the output shaft further being threaded at the first end thereof as well as an aperture through the first end thereof, the pivot assembly further including a pivot support for supporting the output shaft and a hub to further support the output shaft as well as the pivot support, and a castellated nut carried on the threaded end portion to retain the output arms;

a locking cam assembly comprising an inboard cam having a central aperture and a small aperture, an outboard cam also having a central aperture and a small aperture pivotally mounted on a cam pivot pin passing through the central aperture of each cam which also passes into the upper apertures of the first and second output arm to allow the locking cam assembly to be pivotally mounted on the cam pivot pin between the output arms, the locking cam assembly further including a spring suspended from the small aperture of the output cam to the small aperture of the inboard cam for urging the small apertures of each cam towards each other and pivoting the cams around the cam pivot pin such that the lower portion of each cam will be in contact with the top edge of the arcuate locking plate;

a cam pivot pin retainer strip affixed to the outboard end of the legs of the U-shaped bracket to retain the cam pivot pin in the apertures of the output arms, whereby movement of the input arm will cause the U-shaped bracket to urge one of the cams out of contact with the arcuate locking plate and will then contact the output arms and displace them in accordance with the movement of the input arms.

2. A locking control device having an input arm and an output means for communicating motion irreversibly from said input arm to said output means, said locking control device further comprises:

an output shaft having a flat portion extending from a first end of the shaft towards a second end of said output shaft;

an input arm having an aperture at a lower end thereof carried on said output shaft;

a U-shaped bracket affixed to the input arm;

a first output arm carried on said output shaft having a circular aperture in an upper end thereof and a semicircular aperture in a lower end thereof for compatible association with said output shaft;

a locking cam assembly comprising an inboard cam having a central aperture and and a small aperture, an outboard cam also having a central aperture and a small aperture, both cams pivotally carried on a cam pivot pin passing through the central aperture of each cam, the cam pivot pin passing into the upper aperture of said first output arm, the locking cam assembly further including a spring maintained in the tension between said small apertures of said inboard and said outboard cams;

an arcuate locking plate having a central aperture receiving said output shaft, said arcuate locking plate having an upper edge surface contacting said inboard and outboard cams;

a second output arm carried on said output shaft having a circular aperture in an upper end thereof accommodating said cam pivot pin of said locking cam assembly;

a cam pivot pin retainer strip bridging the open end of said U-shaped bracket; and a fastening nut carried on said output shaft for maintaining said second output arm thereon.

* * * * *